US008000275B2

(12) United States Patent
Mourareau

(10) Patent No.: US 8,000,275 B2
(45) Date of Patent: Aug. 16, 2011

(54) METHOD FOR ENABLING AN APPLICATION RECORDED IN A RADIOCOMMUNICATION TERMINAL TO ACCESS FUNCTIONS OF THE TERMINAL AND TERMINAL IMPLEMENTING SAID METHOD

(75) Inventor: Stéphane Mourareau, Les Clayes Sous Bois (FR)

(73) Assignee: Imerj, Ltd., Grand Cayman (KY)

( * ) Notice: Subject to any disclaimer, the term of this patent is extended or adjusted under 35 U.S.C. 154(b) by 667 days.

(21) Appl. No.: 10/495,509

(22) PCT Filed: Nov. 15, 2002

(86) PCT No.: PCT/FR02/03926
§ 371 (c)(1),
(2), (4) Date: Jun. 24, 2004

(87) PCT Pub. No.: WO03/043361
PCT Pub. Date: May 22, 2003

(65) Prior Publication Data
US 2005/0036490 A1 Feb. 17, 2005

(30) Foreign Application Priority Data
Nov. 16, 2001 (FR) ...................................... 01 14867

(51) Int. Cl.
*H04B 7/00* (2006.01)
(52) U.S. Cl. ............ 370/310; 370/469; 710/5; 710/244; 726/1; 726/16
(58) Field of Classification Search .................. 370/393; 717/109; 726/4, 3, 1; 455/456.1; 713/164; 708/108; 710/1
See application file for complete search history.

(56) References Cited

U.S. PATENT DOCUMENTS

| 5,297,192 | A |   | 3/1994  | Gerszberg |
| 5,497,339 | A | * | 3/1996  | Bernard ........................ 708/109 |
| 5,636,282 | A | * | 6/1997  | Holmquist et al. ............. 726/16 |
| 5,732,074 | A |   | 3/1998  | Spaur et al. |
| 5,845,068 | A | * | 12/1998 | Winiger ............................ 726/3 |
| 5,991,879 | A | * | 11/1999 | Still ................................. 726/1 |

(Continued)

FOREIGN PATENT DOCUMENTS
EP 0 689 368 A 12/1995
(Continued)

OTHER PUBLICATIONS

Fielding et al., Hypertext Transfer Protocol—HTTP/1.1, Network Working Group, RFC 2616, pp. 11, 22-23.*

(Continued)

*Primary Examiner* — Kwang B Yao
*Assistant Examiner* — Jeffrey M Rutkowski
(74) *Attorney, Agent, or Firm* — Marsh Fischmann & Breyfodle LLP

(57) ABSTRACT

A method of enabling at least one application (22) stored in a radiocommunications terminal (10) to access functions of said terminal (10), the terminal (10) being suitable for enabling data to be exchanged in both directions in application of a data standard implementing a transfer channel that conveys so-called "AT" commands, the terminal (10) including an AT command manager (15), the method being characterized in that access from the stored application (22) to the terminal (10) takes place by exchanging AT commands via the AT command manager (15).

7 Claims, 1 Drawing Sheet

U.S. PATENT DOCUMENTS

| | | | |
|---|---|---|---|
| 6,061,795 A * | 5/2000 | Dircks et al. ........................ 726/4 |
| 6,167,280 A | 12/2000 | Barrett |
| 6,178,504 B1 * | 1/2001 | Fieres et al. .................. 713/164 |
| 6,292,900 B1 * | 9/2001 | Ngo et al. ......................... 726/1 |
| 6,360,281 B1 * | 3/2002 | Feagans ............................ 710/1 |
| 6,697,421 B1 * | 2/2004 | Monroe et al. ................. 375/222 |
| 7,047,563 B1 * | 5/2006 | Weber et al. .................... 726/17 |
| 7,137,003 B2 * | 11/2006 | Krishnan et al. ................ 726/19 |
| 2002/0083172 A1 * | 6/2002 | Knowles et al. .............. 709/225 |
| 2002/0104071 A1 * | 8/2002 | Charisius et al. ............. 717/109 |
| 2003/0078053 A1 * | 4/2003 | Abtin et al. ................... 455/456 |

FOREIGN PATENT DOCUMENTS

JP    5-103015    4/1993

OTHER PUBLICATIONS

Viega et al., "Trust (and Mistrust) in Secure Applications", Communications of the ACM, Feb. 2001, pp. 31-36.*

"Digital Ceullar Telecommunications System (Phase 2+), at Command Set for GSM Mobil Equipment (GSM 07.07 Version 5.1.0)" European Telecommunication Standard, Nov. 1, 1996, pp. 1-79, XP002083871.

* cited by examiner

METHOD FOR ENABLING AN APPLICATION RECORDED IN A RADIOCOMMUNICATION TERMINAL TO ACCESS FUNCTIONS OF THE TERMINAL AND TERMINAL IMPLEMENTING SAID METHOD

BACKGROUND OF THE INVENTION

1. Field of the Invention

The present invention relates to a method of enabling at least one application stored in a radiocommunications terminal to access functions of the terminal. The invention also relates to a radiocommunications terminal implementing the method.

2. Discussion of the Related Art

A non-exclusive field of application of the invention is that of radiocommunications terminals operating in a cellular radiocommunications network. The invention applies in particular to a system implementing the global system for mobile communications (GSM).

A mobile radiocommunications terminal may include stored applications. These applications can then implement data exchanges between the radiocommunications terminal and the network. An application exchanges data via the software interface of the terminal that is known as the application programming interface (API).

Furthermore, data exchanges between two pieces of data processing terminal equipment, e.g. between a radiocommunications terminal and a conventional portable terminal of the portable microcomputer type, can take place only with so-called AT commands being exchanged between the two terminals via a modem. These AT commands are described in the GSM standards.

AT commands are thus dedicated to configuring and controlling modems.

Until now, AT commands have never been used in an application context, i.e. when the user of a radiocommunications terminal seeks to make use of applications situated in the terminal.

SUMMARY OF THE INVENTION

Accordingly, the present invention is directed to a method of enabling an application stored in a radiocommunications terminal to access functions of the terminal, and a terminal implementing the method that substantially obviates one or more of the problems due to limitations and disadvantages of the related art.

An object of the invention is to make the functions offered by AT commands available to any type of environment for executing applications in a radiocommunications terminal.

To this end, the invention provides a method of enabling at least one application stored in a radiocommunications terminal to access functions of said terminal, said terminal being suitable for enabling data to be exchanged in both directions in application of a data standard implementing a transfer channel that conveys so-called "AT" commands, said terminal including an AT command manager, the method being characterized in that access from the stored application to the terminal takes place by exchanging AT commands via said AT command manager.

In a particular embodiment, the AT commands are exchanged via the hypertext transfer protocol (HTTP).

The invention also provides a terminal for implementing the method, said terminal supporting at least one stored application and having means for enabling data to be exchanged in both directions in application of a data standard implementing a transfer channel conveying AT commands, and also having AT command management means, the terminal being characterized in that it includes means for enabling the application stored in said terminal to access functions of the terminal by exchanging AT commands via the AT command management means.

Other characteristics and advantages of the invention will appear on reading the following description of an embodiment of the invention given by way of non-limiting illustration, and with reference to the drawing specified below.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of enabling an application stored in a radiocommunications terminal to access functions of the terminal, and a terminal implementing the method includes a method of enabling at least one application (22) stored in a radiocommunications terminal (10) to access functions of said terminal (10), said terminal (10) being suitable for enabling data to be exchanged in both directions in application of a data standard implementing a transfer channel that conveys so-called "AT" commands, said terminal (10) including an AT command manager (15), the method being characterized in that access from the stored application (22) to the terminal (10) takes place by exchanging AT commands via said AT command manager (15).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
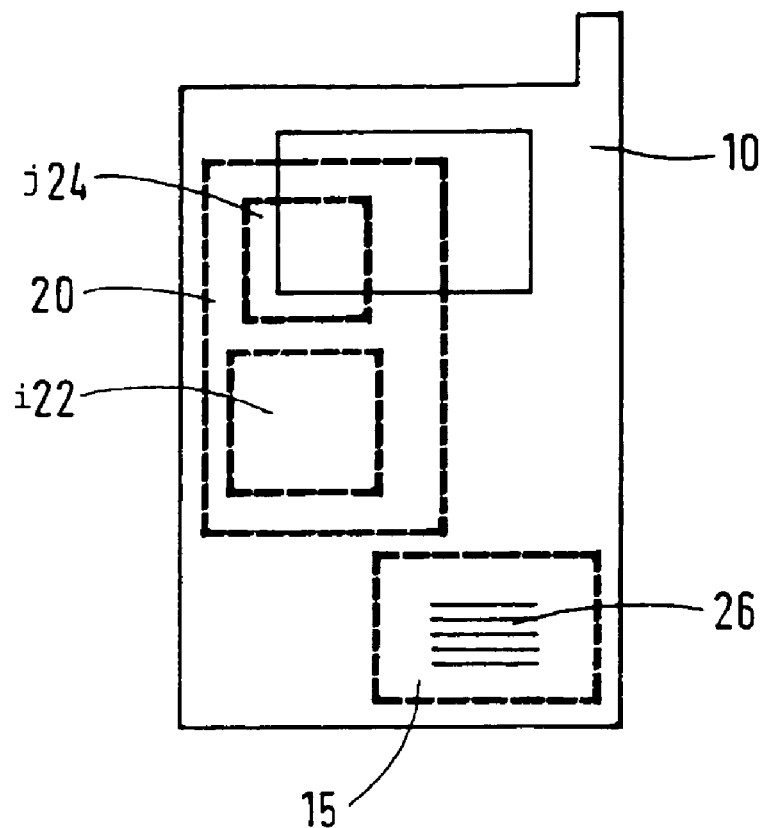
FIG. 1 is a diagram of a terminal using the principle of the invention.
Figure 2:
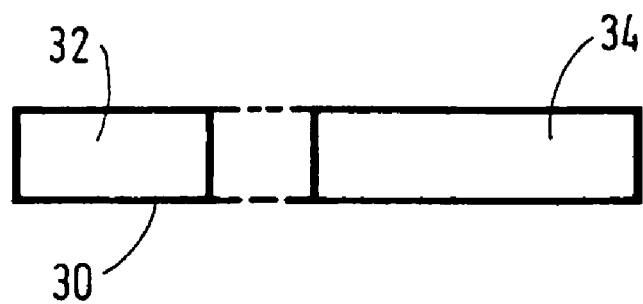
FIG. 2 is a diagram of an HTTP message including an AT command as described in the invention.

FIG. 1 shows a radiocommunications terminal 10 operating in a radiocommunications network. The terminal 10 is suitable for enabling data to be exchanged in both directions using a data standard that implements a transfer channel conveying AT commands.

Conventionally, radiocommunications terminals include an AT command manager enabling them to behave like a modem with respect to other terminals such as a personal computer, thus enabling commands to be exchanged between the terminal 10 and the personal computer. In the invention, AT commands are exchanged within a given terminal 10.

In FIG. 1, the terminal 10 includes an AT command manager 15, a fixed or removable internal memory 20, and stored applications 22 and 24 of different kinds, for example of the banking type and of the commercial ordering type.

The stored applications 22 and 24 may be supplied with the terminal or they may be downloaded by the user from the radiocommunications network. After they have been downloaded, the applications 22 and 24 may be stored in the fixed or removable memory 20.

By downloading applications 22 and 24, the user of the terminal 10 can make use of applications 22 and 24 depending on the requirements of the user, whereas otherwise it would have been necessary to implement the applications in the terminal 10 even if the user does not use them.

These applications 22 and 24 may require access to the functions of the terminal 10 that relate to the field of telephony, for example access to the radiocommunications network in order to undertake operations with the environment outside the terminal 10. They therefore need to make use of the network access resources of the terminal 10.

The applications 22 and 24 access telephony functions using AT commands.

The AT command manager 15 enables AT commands to be handled. It receives requests and returns responses to and from the applications 22 or 24.

The AT command manger 15 is made accessible to the applications 22 and 24 via an HTTP server or via an interface protocol internal to the terminal so as to enable AT commands to be exchanged, these commands being encapsulated by the HTTP protocol within HTTP messages 30.

HTTP messages containing AT commands 30 comprise a header 32 and a body 34 which are described below.

An HTTP server has connection ports 26, some of which are used for access to the AT command manager 15.

When the applications 22 and 24 need to make use of the network access resources of the terminal 10, they contact the HTTP server on the port 26 in order to access the AT command manager 15.

The use of a plurality of ports 26 makes it possible to restrict usage of certain commands to certain applications as a function of a given level of confidence.

By way of example, the level of confidence can relate to the circumstances under which the applications 22 and 24 were downloaded, depending on where the applications come from or on whether or not a secure mechanism was used for downloading.

Each port gives access to a group of AT commands sharing a common level of sensitivity. The sensitivity of an application is defined as a function of its potential for harming a user, i.e. intrusion into the confidential portion of the subscriber identity module (SIM) card, or issuing accesses to the network that will lead to large bills. Sensitivity can be defined by the manufacturer or by the operator.

In the preset example, AT commands are exchanged in the form of a few strings of alphanumeric characters, thereby consuming little of the terminal's resources.

The HTTP server accepts connection requests made by an application 22 on the port 26 requested by the application to enable a request and the associated response to be exchanged in the form of AT commands encapsulated in an HTTP message 30.

For example, the application 22 opens a connection on the HTTP server with the AT command manager 15 over the port 26.

The application 22 builds the request HTTP message constituted by a header 32 and a body 34.

The application 22 then specifies in the header 32 of its HTTP message 30 the number of characters in the body 34. The body 34 of the HTTP message 30 comprises the AT command written as a sequence of alphanumeric characters.

The HTTP response message 30 from the AT command manager 15 is sent via the connection to the HTTP server.

The HTTP response message 30 has a header 32 specifying the status of the request. The body 34 of the HTTP response message 30 contains the response written as a sequence of alphanumeric characters.

When the user requests execution of the application 22, the application makes a connection to the HTTP server in order to access the AT command manager 15. It thus gains access to the telephony functions of the terminal 10 by exchanging AT commands via the HTTP server.

There follows an example of a JAVA type application 22 that has just been downloaded into a terminal 10 by the user of the terminal 10. The application 22 needs to discover the name of the manufacturer of the terminal 10.

This is an example of the request from the application 22 to the AT command manager 15:
GET/HTTP/1.1 (HTTP connection open)
Content-length: 7 (number of characters in the body 34 of the HTTP message 30, i.e. in the AT command)
AT+CGMI (AT command sent to the AT command manager 15)
This is an example of a response:
HTTP/1.1<status value (200=OK)> (connection by the AT command manager 15 authorized via the HTTP server)
Content-length: 15 (number of characters in the body 34 of the HTTP message 30, i.e. in the AT command send by the AT command manager 15)
ALCATEL-MPD (AT command informing the application that it is running on a terminal made by ALCATEL)
OK In the above example, the application 22 accesses information of very low sensitivity level (name of the manufacturer of the terminal 10).

Nevertheless, the application 22 may require information or resources from a very sensitive level of the terminal 10, e.g. its SIM card.

To make this possible, the AT command manger 15 may offer an application 22 access to distinct groups of AT commands of greater or lesser sensitivity level via distinct ports.

The application 22 may be downloaded either from the operator of the radiocommunications network, the manufacturer, or a third party (e.g. a bank).

The level of confidence given to the application 22 will then depend on where it comes from: level of confidence will be higher for a download from the manufacturer than from the operator, and it will be higher from the operator than from a third party.

Depending on confidence level, the application 22 will or will not have access to groups of AT commands at a very sensitive level in the terminal 10.

The operating environment of the terminal 10 then verifies whether the application has user rights over the requested port, i.e. whether it can access the information requested.

The invention thus enables use to be made of an element that is already present in the radiocommunications terminal: namely the AT command manager, and in an applications context that is made secure.

It will be apparent to those skilled in the art that various modifications and variations can be made in the method of enabling an application stored in a radiocommunications terminal to access functions of the terminal, and a terminal implementing the method of the present invention without departing from the spirit or scope of the invention. Thus, it is intended that the present invention cover the modifications and variations of this invention provided they come within the scope of the appended claims and their equivalents.

The invention claimed is:

1. A method of restricting access of an application stored in a memory of a radiocommunications terminal to a function of the radiocommunications terminal, the method comprising:

receiving an AT command from the application stored in the memory of the radiocommunications terminal, the AT command requesting access to the function of the radiocommunications terminal;

determining an access port corresponding to the requested function, the access port being one of a plurality of access ports, wherein each of the plurality of access ports corresponds to at least one function of the radiocommunications terminal and at least one AT command sharing a common level of sensitivity required to access the at least one function of the radiocommunications terminal via the respective access port;

determining whether to grant the application access to the access port as a function of the common level of sensitivity of the AT command and a level of confidence associated with the application; and admitting the application's request for access to the function of the radiocommunications terminal when the application is granted access to the access port.

2. The method of claim 1, further comprising denying the application's request for access to the function of the radiocommunications terminal when the application is not granted access to the access port.

3. The method of claim 1, wherein the AT command is a hypertext transfer protocol (HTTP) message comprising at least a header and a body, the header containing a number of characters making up the AT command and the body containing the characters proper of the AT command.

4. A radiocommunications terminal comprising:

a memory configured to store an application; and a AT command manager comprising a plurality of access ports, each access port corresponding to at least one function of the radiocommunications terminal, an AT command having a common level of security required for the application to access the respective access port, the AT command manager being configured to:

receive an AT command from the stored application requesting access to a particular function of the radiocommunications terminal;

determine which of the plurality of access ports corresponds to the requested function of the radiocommunications terminal;

determine whether to grant the application access to the access port as a function of the common level of sensitivity of the AT command and a level of confidence associated with the application; and admit the application's request for access to the function of the radiocommunications terminal when the application is granted access to the access port.

5. The radiocommunications terminal of claim 4, wherein the AT command manager is further configured to deny the application's request for access to the function of the radiocommunications terminal when the application is not granted access to the access port.

6. The radiocommunications terminal of claim 4, wherein the server is a hypertext transfer protocol (HTTP) server.

7. A radiocommunications terminal comprising:

means for receiving an AT command from an application stored in a memory of the radiocommunications terminal, the AT command requesting access to the function of the radiocommunications terminal;

means for determining an access port corresponding to the requested function, the access port being one of a plurality of access ports, wherein each of the plurality of access ports corresponds to at least one function of the radiocommunications terminal and at least one AT command sharing a common level of sensitivity required to access the at least one function of the radiocommunications terminal via the respective access port;

means for determining whether to grant the application access to the access port as a function of the common level of sensitivity of the AT command and a level of confidence associated with the application; and means for admitting the application's request for access to the function of the radiocommunications terminal when the application is granted access to the access port.

* * * * *

UNITED STATES PATENT AND TRADEMARK OFFICE
CERTIFICATE OF CORRECTION

| | | |
|---|---|---|
| PATENT NO. | : 8,000,275 B2 | Page 1 of 1 |
| APPLICATION NO. | : 10/495509 | |
| DATED | : August 16, 2011 | |
| INVENTOR(S) | : Stephane Mourareau | |

It is certified that error appears in the above-identified patent and that said Letters Patent is hereby corrected as shown below:

On the Title Pg. item (74) Attorney, Agent or Firm - please delete "Marsh Fischmann & Breyfodle LLP" and insert therefore --Marsh Fischmann & Breyfogle LLP--.

Signed and Sealed this
Twenty-ninth Day of November, 2011

David J. Kappos
*Director of the United States Patent and Trademark Office*